United States Patent
Fukushima et al.

(10) Patent No.: US 11,242,445 B2
(45) Date of Patent: Feb. 8, 2022

(54) RESIN ADDITIVE COMPOSITION AND SYNTHETIC RESIN COMPOSITION USING SAME

(71) Applicant: ADEKA CORPORATION, Tokyo (JP)

(72) Inventors: Mitsuru Fukushima, Tokyo (JP); Naoko Tanji, Saitama (JP); Tomonori Shimizu, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 15/751,026

(22) PCT Filed: Jul. 29, 2016

(86) PCT No.: PCT/JP2016/072391
§ 371 (c)(1),
(2) Date: Feb. 7, 2018

(87) PCT Pub. No.: WO2017/029970
PCT Pub. Date: Feb. 23, 2017

(65) Prior Publication Data
US 2018/0230293 A1 Aug. 16, 2018

(30) Foreign Application Priority Data
Aug. 20, 2015 (JP) .............. JP2015-162740

(51) Int. Cl.
*C08K 5/00* (2006.01)
*C08K 5/098* (2006.01)
*C08K 5/527* (2006.01)
*C08L 23/10* (2006.01)
*C08K 5/13* (2006.01)

(52) U.S. Cl.
CPC ............ *C08K 5/527* (2013.01); *C08K 5/00* (2013.01); *C08K 5/098* (2013.01); *C08K 5/13* (2013.01); *C08L 23/10* (2013.01)

(58) Field of Classification Search
CPC .......... C08K 5/527; C08K 5/00; C08K 5/098; C08K 5/13; C08L 23/00; C08L 101/00; C08L 23/10
USPC ....................................................... 524/117
See application file for complete search history.

(56) References Cited

U.S. PATENT DOCUMENTS

| 4,463,113 A | 7/1984 | Nakahara et al. |
| 6,787,067 B2* | 9/2004 | Yukino .................... C08K 5/09 252/182.23 |
| 7,714,046 B2* | 5/2010 | Ishii .................... C08K 5/0083 524/108 |
| 2007/0054996 A1 | 3/2007 | Tobita et al. |
| 2009/0156743 A1 | 6/2009 | Garti et al. |
| 2010/0204374 A1 | 8/2010 | Tanji et al. |
| 2011/0105657 A1 | 5/2011 | Tanji et al. |
| 2012/0190797 A1 | 7/2012 | Kristiansen et al. |

(Continued)

FOREIGN PATENT DOCUMENTS

| CN | 101796103 A | 8/2010 |
| CN | 102844365 A | 12/2012 |

(Continued)

OTHER PUBLICATIONS

JP 2002-338820 A, machine translation, Google Patents. (Year: 2002).*
International Search Report for PCT/JP2016/072391 (PCT/ISA/210) dated Oct. 25, 2016.
Written Opinion of the International Searching Authority for PCT/JP2016/072391 (PCT/ISA/237) dated Oct. 25, 2016.

(Continued)

*Primary Examiner* — Josephine L Chang
(74) *Attorney, Agent, or Firm* — Birch, Stewart, Kolasch & Birch, LLP

(57) ABSTRACT

Provided are: a resin additive composition containing a specific metal phosphate, which composition has excellent dispersibility in a resin even when made into a pellet form and exhibits a desired physical property improving effect when incorporated into a resin; and a synthetic resin composition using the same. The resin additive composition contains, with respect to 100 parts by mass of (A) sodium-2,2'-methylene-bis(4,6-di-tert-butylphenyl)phosphate: 25 to 400 parts by mass of (B) a lithium phosphate compound represented by the following Formula (1); and 10 to 300 parts by mass of (C) a fatty acid metal salt represented by the following Formula (2). The component (C) is incorporated in an amount of 10 parts by mass to 50 parts by mass with respect to a total of 100 parts by mass of the components (A) and (B).

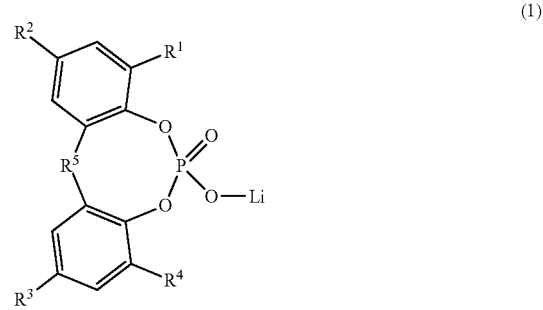

(1)

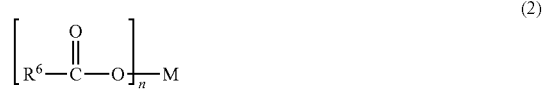

(2)

7 Claims, No Drawings

(56) References Cited

U.S. PATENT DOCUMENTS

2013/0012630 A1 1/2013 Shimizu et al.
2016/0244592 A1 8/2016 Kawamoto et al.

FOREIGN PATENT DOCUMENTS

| EP | 1 666 525 A1 | 6/2006 |
|---|---|---|
| JP | 58-1736 A | 1/1983 |
| JP | 59-184252 A | 10/1984 |
| JP | 63-108063 A | 5/1988 |
| JP | 07-216142 A | 8/1995 |
| JP | 2001-123021 A | 5/2001 |
| JP | 2002-338820 A | 11/2002 |
| JP | 2003-335968 A | 11/2003 |
| JP | 2004-292710 A | 10/2004 |
| JP | 4574839 B2 | 4/2011 |
| WO | WO 2015/087646 A1 | 6/2015 |

OTHER PUBLICATIONS

Extended European Search Report for European Application No. 16836961.9, dated Jun. 26, 2019.
Indian Office Action, dated Mar. 2, 2020, for Indian Application No. 201827006096, with an English translation.

\* cited by examiner

RESIN ADDITIVE COMPOSITION AND SYNTHETIC RESIN COMPOSITION USING SAME

TECHNICAL FIELD

The present invention relates to a resin additive composition comprising a specific metal phosphate. More particularly, the present invention relates to: a resin additive composition which comprises a specific lithium salt compound as a crystal nucleating agent component along with a metal phosphate and has improved dispersibility in resins by incorporating a fatty acid metal salt; and a synthetic resin composition comprising the same.

BACKGROUND ART

Synthetic resins, such as polyolefin resins (e.g., polyethylene, polypropylene and polybutene-1), polyester-based polymers (e.g., polyethylene terephthalate and polybutylene terephthalate) and polyamide-based polymers, have a slow crystallization rate after heat molding. Therefore, not only there are such problems that the molding cycle in processing is long, but also there are cases where the resulting molded article is deformed due to crystallization that proceeds even after molding.

It is known that these drawbacks are attributed to the crystallinity of the synthetic resins and can be solved by allowing fine crystals to be rapidly generated. As a method of generating a large number of fine crystals, for example, it is known to increase the crystallization temperature and/or to add a crystal nucleating agent, a crystallization accelerator or the like.

As the crystal nucleating agent, for example, metal carboxylates, such as sodium benzoate, aluminum 4-tert-butyl-benzoate, sodium adipate and 2-sodium bicyclo[2.2.1]heptane-2,3-dicarboxylate; metal phosphates, such as sodium-bis(4-tert-butylphenyl)phosphate, sodium-2,2'-methylene-bis(4,6-di-tert-butylphenyl)phosphate and lithium-2,2'-methylene-bis(4,6-di-tert-butylphenyl)phosphate; polyhydric alcohol derivatives, such as dibenzylidene sorbitol, bis(methylbenzylidene)sorbitol, bis(3,4-dimethylbenzylidene)sorbitol, bis(p-ethylbenzylidene)sorbitol and bis(dimethylbenzylidene)sorbitol; and amide compounds, such as N,N'-tris[2-methylcyclohexyl]-1,2,3-propane tricarboxamide, N,N'-tricyclohexyl-1,3,5-benzene tricarboxamide, N,N-dicyclohexylnaphthalene dicarboxamide and 1,3,5-tri(2,2-dimethylpropaneamide)benzene, are known.

Among these crystal nucleating agents, as described in Patent Documents 1 to 3, sodium-2,2'-methylene-bis(4,6-di-tert-butylphenyl)phosphate is known as a crystal nucleating agent having excellent effect of improving the physical properties of synthetic resins and is thus widely used.

Further, in Patent Document 4, a crystal nucleating agent composition which contains sodium-2,2'-methylene-bis(4,6-di-tert-butylphenyl)phosphate, aluminum 2,2'-methylene-bis(4,6-di-tert-butylphenyl)phosphate and an aliphatic organic acid metal salt is proposed.

Sodium-2,2'-methylene-bis(4,6-di-tert-butylphenyl)phosphate is in a powder form; however, the use of such powder presents a concern for operational safety associated with airborne particles. In addition, there is a problem that multiple kinds of resin additives in arbitrary amounts must be uniformly blended in accordance with various applications. Therefore, from the standpoints of measurability and operability, there is a high demand for a resin additive composition obtained by molding various resin additives into a pellet form. For instance, Patent Documents 5 and 6 propose resin additive compositions comprising sodium-2,2'-methylene-bis(4,6-di-tert-butylphenyl)phosphate.

RELATED ART DOCUMENTS

Patent Documents

Patent Document 1: Japanese Unexamined Patent Application Publication No. S58-1736
Patent Document 2: Japanese Unexamined Patent Application Publication No. S59-184252
Patent Document 3: Japanese Unexamined Patent Application Publication No. S63-108063
Patent Document 4: Japanese Unexamined Patent Application Publication No. 2002-338820
Patent Document 5: Japanese Unexamined Patent Application Publication No. 2001-123021
Patent Document 6: Japanese Unexamined Patent Application Publication No. 2004-292710

SUMMARY OF THE INVENTION

Problems to be Solved by the Invention

At compound manufacturers, generally, a resin additive is blended into a pellet form resin and the resultant is molded and processed; however, when a powder form resin additive is used, since its specific gravity is largely different from that of the pellet form resin, it is difficult to uniformly mix these components. Particularly, sodium-2,2'-methylene-bis(4,6-di-tert-butylphenyl)phosphate is a compound that is hardly dispersed in a resin; therefore, it is demanded to improve the dispersibility thereof.

Moreover, when sodium-2,2'-methylene-bis(4,6-di-tert-butylphenyl)phosphate is molded into a pellet form resin additive composition, there is also a problem that desired physical properties are not likely to be attained due to deterioration of the dispersibility in a resin and the resin additive composition thus needs to be added in a large amount.

Studies have been conducted for improvement of the dispersibility of sodium-2,2'-methylene-bis(4,6-di-tert-butylphenyl)phosphate; however, none of the studies yielded a satisfactory result.

In view of the above, an object of the present invention is to provide: a resin additive composition comprising a specific metal phosphate, which composition has excellent dispersibility in a resin even when made into a pellet form and exhibits a desired physical property improving effect when incorporated into a resin; and a synthetic resin composition comprising the same.

Means for Solving the Problems

The present inventors intensively studied to discover that the above-described problems can be solved by mixing sodium-2,2'-methylene-bis(4,6-di-tert-butylphenyl)phosphate with a specific lithium salt compound and a fatty acid metal salt, thereby completing the present invention.

The resin additive composition of the present invention is characterized by comprising, with respect to 100 parts by mass of (A) sodium-2,2'-methylene-bis(4,6-di-tert-butylphenyl)phosphate: 25 to 400 parts by mass of (B) a lithium phosphate compound represented by the following Formula (1); and 10 to 300 parts by mass of (C) a fatty acid metal salt represented by the following Formula (2), wherein the content of the component (C) is in a range of 10 parts by mass to 50 parts by mass with respect to a total of 100 parts by mass of the components (A) and (B):

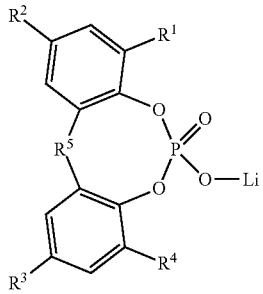

(1)

(wherein, $R^1$ to $R^4$ each represent a linear or branched alkyl group having 1 to 8 carbon atoms; and $R^5$ represents an alkylidene group having 1 to 4 carbon atoms)

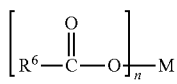

(2)

(wherein, $R^6$ represents an unsubstituted or hydroxy-substituted aliphatic group having 1 to 40 carbon atoms; M represents a metal atom; and n is an integer of 1 to 4, representing a valence of the metal atom M).

It is preferred that the resin additive composition of the present invention further comprises (D) a phenolic antioxidant in an amount of 10% by mass to 50% by mass with respect to a total amount.

The resin additive composition of the present invention is preferably in a pellet form.

The synthetic resin composition of the present invention is characterized by comprising, with respect to 100 parts by mass of a synthetic resin, the above-described resin additive composition of the present invention in a range of 0.001 to 5 parts by mass in terms of the total amount of the components (A) and (B).

Further, in the present invention, a synthetic resin composition wherein the above-described synthetic resin is a polyolefin resin is preferred.

Effects of the Invention

According to the present invention, it is possible to realize a resin additive composition comprising a specific metal phosphate, which composition has excellent dispersibility in a resin even when made into a pellet form and exhibits a desired physical property improving effect when incorporated into a resin; and a synthetic resin composition comprising the same.

MODE FOR CARRYING OUT THE INVENTION

Embodiments of the present invention will now be described in detail.
[(B) Lithium Phosphate Compound]
The lithium phosphate compound used in the present invention is a compound represented by the following Formula (1):

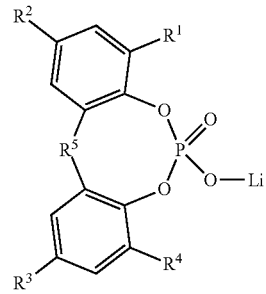

(1)

(wherein, $R^1$ to $R^4$ each represent a linear or branched alkyl group having 1 to 8 carbon atoms; and $R^5$ represents an alkylidene group having 1 to 4 carbon atoms).

Examples of the linear or branched alkyl group having 1 to 8 carbon atoms represented by $R^1$ to $R^4$ in the Formula (1) include methyl, ethyl, propyl, isopropyl, butyl, sec-butyl, tert-butyl, isobutyl, amyl, tert-amyl, hexyl, heptyl, octyl, isooctyl, tert-octyl, and 2-ethylhexyl. In the present invention, a tert-butyl group is particularly preferred.

Examples of the alkylidene group having 1 to 4 carbon atoms represented by $R^5$ in the Formula (1) include methylidene, ethylidene, propylidene, and butylidene.

Examples of a specific structure of the lithium phosphate compound represented by the Formula (1) include those of the following compounds. It is noted here, however, that the present invention is not restricted to the following compounds by any means.

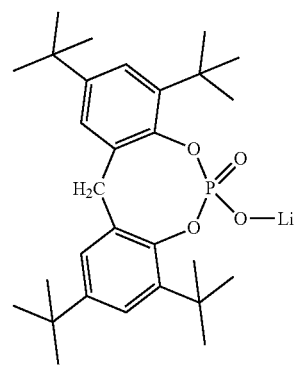

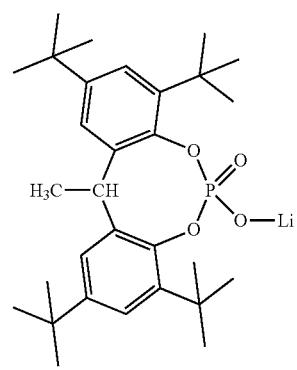

-continued

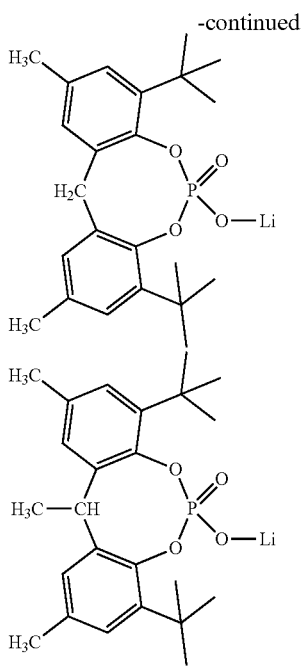

In the present invention, the (B) lithium phosphate compound is used in an amount of 25 to 400 parts by mass, preferably 50 to 100 parts by mass, with respect to 100 parts by mass of (A) sodium-2,2'-methylene-bis(4,6-di-tert-butylphenyl)phosphate. When the used amount of the (B) lithium phosphate compound is outside the range of 25 to 400 parts by mass, the effects of the present invention may not be attained.

[(C) Fatty Acid Metal Salt]

The (C) fatty acid metal salt used in the present invention is a compound represented by the following Formula (2):

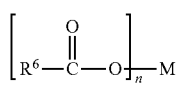

(2)

(wherein, $R^6$ represents an unsubstituted or hydroxy-substituted aliphatic group having 1 to 40 carbon atoms; M represents a metal atom; and n is an integer of 1 to 4, representing a valence of the metal atom M).

Examples of the aliphatic group having 1 to 40 carbon atoms represented by $R^6$ in the Formula (2) include hydrocarbon groups such as alkyl groups, alkenyl groups, and alkyl groups in which two or more unsaturated bonds are introduced, and, optionally, the aliphatic group is substituted with a hydroxy group and/or is branched.

Specific examples thereof include saturated fatty acids, such as acetic acid, propionic acid, butyric acid, valeric acid, isovaleric acid, caproic acid, enanthic acid, caprylic acid, pelargonic acid, capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanoic acid and melissic acid; linear unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid and docosahexaenoic acid; and aromatic fatty acids such as trimesic acid. In the present invention, aliphatic groups having 7 to 21 carbon atoms are preferred, and saturated fatty acids such as myristic acid, stearic acid and 12-hydroxystearic acid are particularly preferred.

Examples of the metal atom represented by M in the Formula (2) include alkali metals, magnesium, calcium, strontium, barium, titanium, manganese, iron, zinc, silicon, zirconium, yttrium, barium, and hafnium. Thereamong, alkali metals such as sodium, lithium and potassium can be particularly preferably used.

In the present invention, the (C) fatty acid metal salt is, for example, preferably lithium stearate, sodium stearate, magnesium stearate, zinc stearate, aluminum stearate, lithium myristate, magnesium behenate or lithium 12-hydroxystearate, more preferably lithium myristate, lithium stearate or lithium 12-hydroxystearate, since these fatty acid metal salts have good performance and can be relatively easily obtained.

The above-exemplified fatty acid metal salts can be produced by a synthesis method in which a carboxylic acid compound and a metal hydroxide are allowed to react with each other and the resultant is subsequently washed with water, dehydrated and dried (double decomposition method), or a synthesis method in which materials are allowed to directly react with each other without the use of water (direct method).

It is required that the (C) fatty acid metal salt be used in an amount of 10 to 300 parts by mass, preferably 20 to 200 parts by mass, with respect to 100 parts by mass of (A) sodium-2,2'-methylene-bis(4,6-di-tert-butylphenyl)phosphate, and in a range of 10 parts by mass to 50 parts by mass with respect to a total of 100 parts by mass of the components (A) and (B). When the amount of the (C) fatty acid metal salt is less than 10 parts by mass with respect to a total of 100 parts by mass of the components (A) and (B), the effects of the present invention may not be attained, whereas when the amount is greater than 50 parts by mass, the performance (nucleator effect) of the crystal nucleating agent components may be suppressed.

In addition to the above-described components (A) to (C), the resin additive composition of the present invention may also contain an arbitrary and known resin additive(s) (e.g., a phenolic antioxidant, a phosphorus-based antioxidant, a thioether-based antioxidant, an ultraviolet absorber, a hindered amine compound, a crystal nucleating agent other than the components (A) and (B), a flame retardant, a flame retardant aid, a lubricant, a filler, a metallic soap, a hydrotalcite, an antistatic agent, a pigment and a dye) in such a range that does not markedly impair the effects of the present invention. Such known resin additives may be incorporated into a synthetic resin separately from the resin additive composition of the present invention.

Particularly, it is preferred that the resin additive composition of the present invention further comprises (D) a phenolic antioxidant.

[(D) Phenolic Antioxidant]

The phenolic antioxidant used in the present invention is a known antioxidant which contains a phenol skeleton in its molecular structure. Specific examples of such an antioxidant include 2,6-di-tert-butyl-p-cresol, 2,6-diphenyl-4-octadecyloxyphenol, stearyl(3,5-di-tert-butyl-4-hydroxyphenyl) propionate, distearyl(3,5-di-tert-butyl-4-hydroxybenzyl) phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[3-(3,5-di-tert-butyl-4-hydroxyphenyl)propynyloxymethyl]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-t etraoxaspiro[5.5]undecane, and triethylene glycol-bis[β-(3-tert-butyl-4-hydroxy-5-methylphenyl)propionate].

Thereamong, tetrakis[3-(3,5-di-tert-butyl-4-hydroxyphenyl)propynyloxymethyl]methane is particularly preferred since it imparts a polyolefin resin with excellent antioxidative effect and makes it easy to mold the resin additive composition into a pellet form.

The amount of the phenolic antioxidant to be used is preferably adjusted in a range of 10% by mass to 50% by mass with respect to the total amount of the resin additive composition. By using the phenolic antioxidant in an amount of 10% by mass or greater, it is made easy not only to mold the resin additive composition into a pellet but also to maintain the form of the pellet. Further, by using the phenolic antioxidant in an amount of 50% by mass or less, the effects of the present invention can be attained more favorably without hindering the actions and effects of the crystal nucleating agents provided by the components (A) and (B).

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, diisodecylpentaerythritol diphosphite, dioleyl hydrogen phosphite, trilauryl trithiophosphite, bis(tridecyl)phosphite, tris (isodecyl)phosphite, tris(tridecyl)phosphite, diphenyldecyl phosphite, dinonylphenyl-bis(nonylphenyl)phosphite, poly (dipropylene glycol)phenyl phosphite, tetraphenyl dipropylene glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-tert-butylphenyl)pentaerythritol diphosphite, bis (2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis (2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)-tris(1,1-dimethylethyl)-5-methyl-4,1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl) phosphite, tris(2-[(2,4,8,10-tetrakis-tert-butyldibenzo[d][1, 3,2]dioxaphosphepin-6-yl)oxy]ethyl)amine, 3,9-bis(4-nonylphenoxy)-2,4,8,10-tetraoxa-3,9-diphosphaspiro[5.5] undecane, 2,4,6-tri-tert-butylphenyl-2-butyl-2-ethyl-1,3-propanediol phosphite, and poly-4,4'-isopropylidene diphenol C12-15 alcohol phosphite.

The phosphorus-based antioxidant is used in a range of preferably 0.001 to 10 parts by mass, more preferably 0.01 to 0.5 parts by mass, with respect to 100 parts by mass of a synthetic resin.

Examples of the thioether-based antioxidant include tetrakis[methyl ene-3-(laurylthio)propionate]methane, bis (methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis (6-tert-butyl-p-cresol), and distearyl disulfide.

The thioether-based antioxidant is used in a range of preferably 0.001 to 10 parts by mass, more preferably 0.01 to 0.5 parts by mass, with respect to 100 parts by mass of a synthetic resin.

Examples of the ultraviolet absorber include 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyl oxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy) benzoate, hexadecyl(3,5-di-tert-butyl-4-hydroxy)benzoate, octadecyl(3,5-di-tert-butyl-4-hydroxy)benzoate and behenyl (3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-, β,β-diphenylacrylate and methyl-2-cyano-3-methyl-3-(p- methoxyphenyl)acrylate; and a variety of metal salts and metal chelates, particularly salts and chelates of nickel and chromium.

The ultraviolet absorber is used in a range of preferably 0.001 to 5 parts by mass, more preferably 0.005 to 0.5 parts by mass, with respect to 100 parts by mass of a synthetic resin.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazin e polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-tri azine-6-yl]aminoun decane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl)piperidyl}decanedionate, bis{4-(2,2,6,6-tetramethyl-1-undecyloxy)piperidyl)carbonate, and TINUVIN® NOR™ 371 manufactured by Ciba Specialty Chemicals K.K.

The hindered amine compound is used in a range of preferably 0.001 to 5 parts by mass, more preferably 0.005 to 0.5 parts by mass, with respect to 100 parts by mass of a synthetic resin.

Examples of the crystal nucleating agent other than the components (A) and (B) include metal carboxylates, such as sodium benzoate, aluminum 4-tert-butylbenzoate, sodium adipate and 2-sodium-bicyclo[2.2.1]heptane-2,3-dicarboxylate; polyhydric alcohol derivatives, such as dibenzylidene sorbitol, bis(methylbenzylidene)sorbitol, bis(3,4-dimethylbenzylidene)sorbitol, bis(p-ethylbenzylidene)sorbitol and bis(dimethylbenzylidene)sorbitol; and amide compounds, such as N,N'-tris[2-methylcyclohexyl]-1,2,3-propane tricarboxamide, N,N,N'-tricyclohexyl-1,3,5-benzene tricarboxamide, N,N-dicyclohexylnaphthalene dicarboxamide and 1,3,5-tri(dimethylisopropoylamino)benzene.

As for the amount of such other crystal nucleating agent to be used, the total amount of crystal nucleating agents including the components (A) and (B) is preferably in a range of 0.001 to 5 parts by mass, more preferably 0.005 to 0.5 parts by mass, with respect to 100 parts by mass of a synthetic resin.

Examples of the flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, ADK STAB FP-500 (trade name; manufactured by ADEKA Corporation), ADK STAB FP-600 (trade name; manufactured by ADEKA Corporation) and ADK STAB FP-800 (trade name; manufactured by ADEKA Corporation); phosphonates, such as divinyl phenylphosphonate, diallyl phenylphosphonate and (1-butenyl)phenylphosphonate; phosphinates, such as phenyl diphenylphosphinate, methyl diphenylphosphinate and 9,10-dihydro-9-oxa-10-phosphaphenanthlene-10-oxide derivatives; phosphazene compounds, such as bis(2-allylphenoxy)phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene. These flame retardants are preferably used in combination with a drip inhibitor such as a fluorocarbon resin and/or a flame retardant aid such as a polyhydric alcohol or hydrotalcite.

The flame retardant is used in a range of preferably 1 to 50 parts by mass, more preferably 10 to 30 parts by mass, with respect to 100 parts by mass of a synthetic resin.

The lubricant is added for the purposes of imparting the surface of the resulting molded article with lubricity and improving the damage preventing effect. Examples of the lubricant include unsaturated fatty acid amides, such as oleic acid amide and erucic acid amide; saturated fatty acid amides, such as behenic acid amide and stearic acid amide; butyl stearate; stearyl alcohols; stearic acid monoglyceride; sorbitan monopalmitate; sorbitan monostearate; mannitol; stearic acid; hardened castor oil; and ethylenebis stearic acid amide. These lubricants may be used individually, or two or more thereof may be used in combination.

The lubricant(s) is/are used in a range of preferably 0.01 to 2 parts by mass, more preferably 0.03 to 0.5 parts by mass, with respect to 100 parts by mass of a synthetic resin.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, silica, alumina, potassium titanate whiskers, wollastonite and fibrous magnesium oxysulfate, and any of these fillers can used by appropriately selecting the particle size (the fiber diameter, fiber length and aspect ratio in the case of a fibrous filler). Further, the filler to be used can be subjected to a surface treatment as required.

The filler is used in a range of preferably 0.01 to 80 parts by mass, more preferably 1 to 50 parts by mass, with respect to 100 parts by mass of a synthetic resin.

As the metallic soap, salts formed by a metal, such as magnesium, calcium, aluminum or zinc, and a saturated or unsaturated fatty acid, such as lauric acid, myristic acid, palmitic acid, stearic acid, behenic acid or oleic acid, can be used.

The metallic soap is used in a range of preferably 0.001 to 10 parts by mass, more preferably 0.01 to 5 parts by mass, with respect to 100 parts by mass of a synthetic resin.

The hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum atoms are substituted with other metal such as an alkali metal or zinc; and hydrotalcites in which the hydroxyl group(s) and/or carbonate group is/are substituted with other anionic group(s), specifically hydrotalcites represented by the following Formula (3) in which a metal is substituted with an alkali metal. In addition, as an Al—Li hydrotalcite, a compound represented by the following Formula (4) can be used as well.

$$Mg_{x1}Zn_{x2}Al_2(OH)_{2(x1+x2)+4}(CO_3) \cdot pH_2O \quad (3)$$

(wherein, x1 and x2 each represent a number that satisfies the conditions represented by the following equations; and p represents 0 or a positive number:

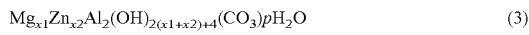

$$0 \leq x2/x1 < 10, 2 \leq (x1+x2) \leq 20)$$

$$[Li_{1/3}Al_{2/3}(OH)_2] \cdot [A^{q-}{}_{1/3q} \cdot pH_2O] \quad (4)$$

(wherein, $A^{q-}$ represents an anion having a valence of q; and p represents 0 or a positive number) Further, the carbonate anion in the above-described hydrotalcites may be partially substituted with other anion.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzene-sulfonate, a higher fatty acid amide, a higher fatty acid ester, or a wax.

The hydrotalcite may be a naturally-occurring or synthetic hydrotalcite. Examples of a method of synthesizing such a compound include known methods that are described in Japanese Examined Patent Publication No. S46-2280, Japanese Examined Patent Publication No. S50-30039, Japanese Examined Patent Publication No. S51-29129, Japanese Examined Patent Publication No. H3-36839, Japanese Unexamined Patent Application Publication No. S61-174270, Japanese Unexamined Patent Application Publication No. H5-179052 and the like. Further, the above-exemplified hydrotalcites can be used without any restriction on the crystal structure, crystal particle and the like.

The hydrotalcite is used in a range of preferably 0.001 to 5 parts by mass, more preferably 0.05 to 3 parts by mass, with respect to 100 parts by mass of a synthetic resin.

Examples of the above-described antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents, such as polyhydric alcohol fatty acid esters, polyglycol phosphates and polyoxyethylene alkyl allyl ethers; and amphoteric antistatic agents, such as amphoteric alkyl betaines (e.g., alkyldimethylamino acetic acid betaines) and imidazoline-type amphoteric activators. These antistatic agents may be used individually, or two or more thereof may be used in combination.

The antistatic agent(s) is/are used in a range of preferably 0.03 to 2 parts by mass, more preferably 0.1 to 0.8 parts by mass, with respect to 100 parts by mass of a synthetic resin.

As the above-described pigment, a commercially available pigment can be used as well, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240 and 254; PIGMENT ORANGE 13, 31, 34, 36, 38, 43, 46, 48, 49, 51, 52, 55, 59, 60, 61, 62, 64, 65 and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180 and 185; PIGMENT GREEN 7, 10 and 36; PIGMENT BLUE 15, 15:1, 15:2, 15:3, 15:4, 15:5, 15:6, 22, 24, 56, 60, 61, 62 and 64; and PIGMENT VIOLET 1, 19, 23, 27, 29, 30, 32, 37, 40 and 50.

Examples of the above-described dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be used in combination.

The resin additive composition of the present invention is preferably in a pellet form. As a method of producing the resin additive composition in a pellet form, a mixture obtained by mixing the above-described components (A) to (C) and phenolic antioxidant with other additive(s) optionally incorporated as required can be mixed in the presence of the phenolic antioxidant in a molten state. The processing conditions, the processing equipments and the like are not restricted at all, and any well-known and commonly used processing method and processing equipments can be used.

Specific examples of the production method include a disk pelleter method and an extrusion method. In the present invention, an extrusion method which can easily achieve mass production and exhibits excellent maintenance of the pellet form is preferred. Further, the processing temperature in the extrusion method is preferably in a range of from not lower than the melting point of the phenolic antioxidant to 50° C. higher than the melting point. When the processing temperature is lower than the melting point of the phenolic antioxidant, the resulting pellet may have insufficient form stability, whereas when the processing temperature is higher than the melting point of the phenolic antioxidant by more than 50° C., the fluidity of the resulting resin additive composition is increased and this may make it difficult to mold the resin additive composition.

(Powdering Rate)

It is preferred that the pellet form resin additive composition of the present invention is capable of maintaining a product shape during transportation. Specifically, when 100 g of a sample thereof that does not pass through a sieve having a mesh opening size of 1.39 mm is placed in a 500-ml plastic container and subjected to 4-hour shaking at an amplitude of 40 mm and a shaking rate of 300 cycles/min, it is desired that the amount of the sample passing through the sieve having a mesh opening size of 1.39 mm be preferably less than 1% by mass, more preferably less than 0.5% by mass.

The synthetic resin composition of the present invention comprises, with respect to 100 parts by mass of a synthetic resin, the above-described resin additive composition of the present invention in a range of 0.001 to 5 parts by mass, preferably 0.005 to 0.5 parts by mass, in terms of the total amount of the components (A) and (B). When the total amount of the components (A) and (B) is less than the above-described range, the effects of the crystal nucleating agents may not be attained, whereas when the total amount of the components (A) and (B) is greater than the above-described range, an effect corresponding to the added amount may not be attained, which is uneconomical, and the components (A) and (B) may appear on the surface of the resulting molded article and deteriorate the outer appearance. In both of these cases, the expected effects of the present invention are not attained.

In cases where the resin additive composition of the present invention is blended with a synthetic resin and the resultant is molded, a known molding method can be employed to perform the molding. For example, when the synthetic resin is a thermoplastic resin, a molded article can be obtained by injection molding, extrusion molding, blow molding, vacuum molding, inflation molding, calender molding, slush molding, dip molding, foam molding or the like.

Meanwhile, when the synthetic resin is a curable resin that can be cured by heat, light, radiation or the like, a molded article can be obtained by compression molding, injection molding, low-pressure molding, laminate molding or the like.

Examples of the synthetic resin used in the present invention include α-olefin polymers, such as polypropylene, high-density polyethylene, low-density polyethylene, linear low-density polyethylene, polybutene-1 and poly-3-methylpentene; polyolefins and copolymers thereof, such as ethylene-vinyl acetate copolymers, ethylene-ethyl acrylate copolymers, ethylene-methyl acrylate copolymers, ethylene-acrylic acid copolymers, ethylene-methacrylic acid copolymers, ethylene-vinyl alcohol copolymers and ethylene-propylene copolymers; halogen-containing resins, such as polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polystyrene; polyvinyl acetate; acrylic resins; copolymers (e.g., AS resins, ABS resins, MBS resins and heat-resistant ABS resins) composed of styrene and/or α-methylstyrene with other monomer (e.g., maleic anhydride, phenylmaleimide, methyl methacrylate, butadiene or acrylonitrile); linear polyesters, such as polymethyl methacrylate, polyvinyl alcohol, polyvinyl formal, polyvinyl butyral, polyethylene terephthalate and polybutylene terephthalate; polyamides, such as polyphenylene oxide, polycaprolactam and polyhexamethylene adipamide; thermoplastic resins and blends thereof, such as polycarbonate, polycarbonate/ABS resin, branched polycarbonate, polyacetal, polyphenylene sulfide, polyurethane, triacetyl cellulose and cellulose-based resins; and thermosetting resins, such as phenol resins, urea resins, melamine resins, epoxy resins and unsaturated polyester resins. Further, the synthetic resin may be an elastomer, such as an isoprene rubber, a butadiene rubber, an acrylonitrile-butadiene copolymer rubber or a styrene-butadiene copolymer rubber. These synthetic resins may be used individually, or two or more thereof may be used in combination.

As the synthetic resin used in the present invention, a polyolefin resin selected from ethylene homopolymers, propylene homopolymers, ethylene/propylene block or random copolymers and non-ethylene α-olefin/propylene block or random copolymers is preferred because the effects of the present invention are prominently attained.

Examples of the use of the synthetic resin composition of the present invention include automobile materials, such as bumpers, dash boards and instrument panels; housing applications, such as refrigerators, laundry machines and vacuum cleaners; household articles, such as tablewares, buckets and bath goods; miscellaneous goods such as toys; storage applications such as tanks; molded articles such as storage containers; films; and fibers.

EXAMPLES

The present invention will now be described more concretely by way of examples thereof; however, the present invention is not restricted thereto by any means.

Using a Henschel mixer (trade name: FM200, manufactured by Mitsui Mining Co., Ltd.; at a blade rotation speed of 1,000 rpm for 1 minute), 100 parts by mass of a polypropylene block copolymer having a melt flow rate of 25 g/10 min was mixed with 0.1 parts by mass of tetrakis[methylene-3-(3',5'-di-tert-butyl-4'-hydroxyphenyl)propionate]methane as a phenolic antioxidant, 0.1 parts by mass of tris(2,4-di-tert-butylphenyl)phosphite as a phosphorus-based antioxidant, 0.05 parts by mass of calcium stearate as a neutralizer and the respective resin additive compositions shown in Table 1 or 2 below. Then, using twin screw extruder (PCM-30, manufactured by Ikegai Corp.), the resulting mixtures were each granulated under processing conditions of a temperature of 240° C. and a screw speed of 160 rpm, whereby pellets of synthetic resin compositions were obtained.

(Flexural Modulus)

Using an injection molding machine (EC 100-2A; manufactured by Toshiba Machine Co., Ltd.), the thus obtained pellets were each injection-molded at an injection temperature of 230° C. and mold temperature of 50° C. to prepare test pieces of 10 mm in width, 80 mm in length and 4 mm in thickness. Immediately after the injection molding, the thus obtained test pieces were conditioned for at least 48 hours in an incubator having an inner temperature of 23° C. and subsequently subjected to the measurement of flexural modulus using a bending tester.

The results thereof are shown in Table 1 below.

(Crystallization Temperature)

A small amount of each pellet obtained above was cut out, and the crystallization temperature thereof was measured using a differential scanning calorimeter (DIAMOND, manufactured by PerkinElmer Co., Ltd.). As for the measurement method, in a chart obtained by heating the subject pellet from room temperature to 230° C. at a rate of 50° C./min, maintaining the pellet for 10 minutes and then cooling the pellet to 50° C. at a rate of −10° C./min, the temperature at which endothermic reaction formed a peak top was defined as the crystallization temperature.

The results thereof are shown in Table 2 below.

According to Comparative Examples 1-3 to 1-5, the physical property improving effect was poor when any one of the components (A), (B) and (C) of the resin additive composition of the present invention was not incorporated. In addition, from Comparative Example 1-2, it was confirmed that the change of the component (B) to a nucleating agent different from that of the resin additive composition of the present invention also resulted in poor physical property improving effect.

In contrast, the resin additive compositions of Examples according to the present invention were all confirmed to have excellent physical property improving effect.

TABLE 2

| | Resin additive composition | Amount of resin additive composition with respect to 100 parts by mass of resin [parts by mass] | Evaluation Crystallization temperature [° C.] |
|---|---|---|---|
| Example 2-1 | Resin additive composition of Example 1-2 | 0.03 | 128 |

TABLE 2-continued

| | Resin additive composition | Amount of resin additive composition with respect to 100 parts by mass of resin [parts by mass] | Evaluation Crystallization temperature [° C.] |
|---|---|---|---|
| Example 2-2 | Resin additive composition of Example 1-2 | 0.05 | 131 |
| Example 2-3 | Resin additive composition of Example 1-2 | 0.1 | 132.5 |
| Comparative Example 2-1 | Control | 0 | 123 |
| Comparative Example 2-2 | Compound A | 0.03 | 125.4 |
| Comparative Example 2-3 | Compound A | 0.05 | 129.5 |
| Comparative Example 2-4 | Compound A | 0.1 | 130.5 |

From the results of Comparative Examples 2-2 to 2-4 shown in Table 2, it was confirmed that, as compared to those cases where Compound A was incorporated alone, the resin additive compositions of Examples according to the present invention had a higher effect of improving the resin crystallization temperature.

Next, with regard to resin additive compositions, the effect of being in a pellet form and that of being in a powder form were evaluated.

By manual blending, 100 parts by mass of a polypropylene block copolymer having a melt flow rate of 25 g/10 min at 230° C. was blended for 5 minutes with the respective resin additive compositions shown in Table 3 below. Then, using twin screw extruder (PCM-30, manufactured by Ikegai Corp.), the resulting mixtures were each granulated under processing conditions of a temperature of 240° C. and a screw speed of 160 rpm, whereby pellets of synthetic resin compositions were obtained.

Using an injection molding machine (EC 100-2A; manufactured by Toshiba Machine Co., Ltd.), the thus obtained pellets were each injection-molded at an injection temperature of 230° C. and mold temperature of 50° C. to prepare test pieces of 10 mm in width, 80 mm in length and 4 mm in thickness. Immediately after the injection molding, the thus obtained test pieces were conditioned for at least 48 hours in an incubator having an inner temperature of 23° C., and the flexural modulus was measured in accordance with the test method of ISO178. The results thereof are shown in Table 3 below.

TABLE 3

| | Resin additive composition | Amount of resin additive composition with respect to 100 parts by mass of resin [parts by mass] | Flexural modulus in pellet form [MPa] | Flexural modulus in powder form [MPa] |
|---|---|---|---|---|
| Example 3-1 | Resin additive composition of Example 1-4 | 0.05 | 1,460 | 1,530 |
| Example 3-2 | Resin additive composition of Example 1-4 | 0.1 | 1,510 | 1,560 |
| Comparative Example 3-1 | Control | — | 1,190 | 1,190 |
| Comparative Example 3-2 | Compound A | 0.05 | 1,260 | 1,430 |
| Comparative Example 3-3 | Compound A | 0.1 | 1,350 | 1,470 |

According to Comparative Example 3-2, a nucleator effect was hardly obtained when Compound A alone was incorporated in an amount of 0.05 parts by mass with respect to 100 parts by mass of the pellet form polypropylene block copolymer. On the other hand, the resin additive compositions of Examples according to the present invention were confirmed to be capable of imparting the pellet form polypropylene block copolymer with a nucleator effect even at a low amount.

Next, the effects of using the resin additive composition of the present invention in a pellet form resin additive composition will be described.

Production Example 1

| | |
|---|---|
| sodium-2,2'-methylene-bis(4,6-di-tert-butylphenyl)phosphate | 9.5% by mass |
| lithium-2,2'-methylene-bis(4,6-di-tert-butylphenyl)phosphate | 9.5% by mass |
| lithium myristate | 9.5% by mass |
| phenolic antioxidant: tetrakis[3-(3,5-di-tert-butyl-4-hydroxyphenyl)propynyloxymethyl]methane | 28.6% by mass |
| phosphorus-based antioxidant: tris(2,4-di-tert-butylphenyl)phosphite | 28.6% by mass |
| catalyst deactivator: calcium stearate | 14.3% by mass |

After mixing these materials in accordance with the above formulation using a Henschel mixer (FM200, manufactured by Mitsui Mining Co., Ltd.) at 1,000 rpm for 1 minute, the resulting mixture was processed using twin screw extruder (PCM-30, manufactured by Ikegai Corp.) under the conditions where the cylinder temperature was set to be 30° C. at the sample inlet, 130° C. in the center and 100° C. in the vicinity of the product outlet and the extrusion screw rotation speed was set to be 60 rpm, whereby a pellet form resin additive composition was produced.

It is noted here that the formulation of this resin additive composition corresponds to that of the resin additive composition evaluated in Example 1-4.

Comparative Production Example 1

| | |
|---|---|
| sodium-2,2'-methylene-bis(4,6-di-tert-butylphenyl)phosphate | 28.5% by mass |
| phenolic antioxidant: tetrakis[3-(3,5-di-tert-butyl-4-hydroxyphenyl)propynyloxymethyl]methane | 28.6% by mass |
| phosphorus-based antioxidant: tris(2,4-di-tert-butylphenyl)phosphite | 28.6% by mass |
| catalyst deactivator: calcium stearate | 14.3% by mass |

After mixing these materials in accordance with the above formulation using a Henschel mixer (FM200, manufactured by Mitsui Mining Co., Ltd.) at 1,000 rpm for 1 minute, the resulting mixture was processed using twin screw extruder (PCM-30, manufactured by Ikegai Corp.) under the conditions where the cylinder temperature was set to be 30° C. at the sample inlet, 130° C. in the center and 100° C. in the vicinity of the product outlet and the extrusion screw rotation speed was set to be 60 rpm, whereby a pellet-form resin additive composition was produced.

Comparative Production Example 2

| | |
|---|---|
| lithium-2,2'-methylene-bis(4,6-di-tert-butylphenyl)phosphate | 28.5% by mass |
| phenolic antioxidant: tetrakis[3-(3,5-di-tert-butyl-4-hydroxyphenyl)propynyloxymethyl]methane | 28.6% by mass |
| phosphorus-based antioxidant: tris(2,4-di-tert-butylphenyl)phosphite | 28.6% by mass |
| catalyst deactivator: calcium stearate | 14.3% by mass |

After mixing these materials in accordance with the above formulation using a Henschel mixer (FM200, manufactured by Mitsui Mining Co., Ltd.) at 1,000 rpm for 1 minute, the resulting mixture was processed using twin screw extruder (PCM-30, manufactured by Ikegai Corp.) under the conditions where the cylinder temperature was set to be 30° C. at the sample inlet, 130° C. in the center and 100° C. in the vicinity of the product outlet and the extrusion screw rotation speed was set to be 60 rpm, whereby a pellet form resin additive composition was produced.

Production Example 2

(Production of Test Sample A)

The pellet of the resin additive composition produced in Production Example 1 was added to 100 parts by mass of a homopolypropylene having a melt flow rate of 8 g/10 min at 230° C. such that sodium-2,2'-methylene-bis(4,6-di-tert-butylphenyl)phosphate, lithium-2,2'-methylene-bis(4,6-di-tert-butylphenyl)phosphate and lithium myristate were incorporated in a total of 0.1 parts by mass, and the resultant was granulated using twin screw extruder (PCM-30, manufactured by Ikegai Corp.) at a temperature of 240° C. and a screw speed of 160 rpm to obtain a pellet of a synthetic resin composition (test sample A: pellet form).

Further, a powder form resin additive composition having the same formulation as the pellet produced in Production Example 1 was granulated under the same conditions to obtain a pellet of a synthetic resin composition (test sample A: powder).

Comparative Production Example 3

(Production of Test Sample B)

A pellet of a synthetic resin composition (test sample B: pellet form) was produced in the same manner as in Production Example 2, except that the pellet of the resin additive composition produced in Production Example 1 was changed to the pellet of the resin additive composition obtained in Comparative Production Example 1 and that the pellet was added such that sodium-2,2'-methylene-bis(4,6-di-tert-butylphenyl)phosphate was incorporated in an amount of 0.1 parts by mass.

Further, a powder form resin additive composition having the same formulation as the pellet produced in Comparative Production Example 1 was granulated under the same conditions to obtain a pellet of a synthetic resin composition (test sample B: powder).

Comparative Production Example 4

(Production of Test Sample C)

A pellet of a synthetic resin composition (test sample C: pellet form) was produced in the same manner as in Production Example 2, except that the pellet of the resin additive composition produced in Production Example 1 was changed to the pellet of the resin additive composition obtained in Comparative Production Example 2 and that the pellet was added such that lithium-2,2'-methylene-bis(4,6-di-tert-butylphenyl)phosphate was incorporated in an amount of 0.1 parts by mass.

Further, a powder form resin additive composition having the same formulation as the pellet produced in Comparative Production Example 2 was granulated under the same conditions to obtain a pellet of a synthetic resin composition (test sample C: powder).

(Flexural Modulus)

Using an injection molding machine (EC 100-2A; manufactured by Toshiba Machine Co., Ltd.), the pellets obtained above were each injection-molded at an injection temperature of 230° C. and mold temperature of 50° C. to prepare test pieces having a size of 80 mm×10 mm×4 mm. After leaving these test pieces in a 23° C. incubator for at least 48 hours, the flexural modulus (MPa) of each test piece was measured in accordance with ISO178. The results thereof are shown in Table 4 below.

(Heat Deflection Temperature)

Using an injection molding machine (EC 100-2A; manufactured by Toshiba Machine Co., Ltd.), the pellets obtained above were each injection-molded at an injection temperature of 230° C. and mold temperature of 50° C. to prepare test pieces having a size of 80 mm×10 mm×4 mm. After leaving these test pieces in a 23° C. incubator for at least 48 hours, the Heat Deflection Temperature (° C.) of each test piece was measured in accordance with ISO75 (load: 1.8 MPa). The results thereof are shown in Table 4 below.

It is noted here that the units of the numerical values shown in Table 4 below are parts by mass.

TABLE 4

| | Production Example 2 Test sample A | Comparative Production Example 3 Test sample B | Comparative Production Example 4 Test sample C |
|---|---|---|---|
| Polypropylene resin | 100 | 100 | 100 |
| Component (A) Compound A | 0.033 | 0.1 | |
| Component (B) Compound B | 0.033 | | 0.1 |
| Component (C) LIM | 0.033 | | |
| Phenolic antioxidant AO-60*[6] | 0.1 | 0.1 | 0.1 |
| Phosphours based antioxidant 2112*[7] | 0.1 | 0.1 | 0.1 |
| Catalyst deactivator Ca-St*[8] | 0.05 | 0.05 | 0.05 |
| Flexural modulus [MPa] (pellet form) | 2,090 | 1,990 | 1,890 |
| Flexural modulus [MPa] (powder) | 2,110 | 2,040 | 1,950 |
| HDT [° C.] (pellet form) | 115 | 109 | 105 |
| HDT [° C.] (powder) | 115 | 112 | 107 |

*[6]AO-60: tetrakis[3-(3,5-di-tert-butyl-4-hydroxyphenyl)propynyloxymethyl]methane
*[7]2112: tris(2,4-di-tert-butylphenyl)phosphite
*[8]Ca-St: calcium stearate According to Comparative Production Examples 3 and 4, as compared to the cases where a powder form resin additive composition was incorporated, the physical properties were markedly reduced in the pellet form resin additive compositions containing only the component (A) or (B) as a crystal nucleating agent component.

On the other hand, from Production Example 2, it was confirmed that the resin additive composition according to the present invention in a pellet form had comparable physical properties and exhibited excellent dispersion in a resin as compared to the case where the resin additive composition was incorporated in a powder form.

The invention claimed is:

1. A resin additive composition comprising:
   (A) sodium-2,2'-methylene-bis(4,6-di-tert-butylphenyl) phosphate;
   (B) a lithium phosphate compound represented by the following Formula (1); and
   (C) at least one fatty acid metal salt selected from the group consisting of lauric acid metal salt, myristic acid metal salt, palmitic acid metal salt, stearic acid metal salt, arachidic acid metal salt, behenic acid metal salt, and 12-hydroxystearic acid metal salt, and wherein the metal is lithium,
   wherein a content of said component (B) is in the range of 25 to 400 parts by mass with respect to 100 parts by mass of said component (A); and
   wherein a content of said component (C) is in the range of 10 to 50 parts by mass with respect to 100 parts by mass of said components (A) and (B):

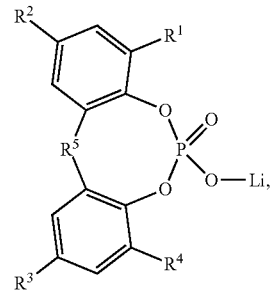
(1)

wherein, $R^1$ to $R^4$ represent a t-butyl group; and $R^5$ represents a methylene group.

2. The resin additive composition according to claim 1, wherein said component (C) is selected from the group consisting of myristic acid metal salt, stearic acid metal salt and 12-hydroxystearic acid metal salt.

3. The resin additive composition according to claim 1, further comprising (D) a phenolic antioxidant in an amount of 10% by mass to 50% by mass with respect to a total amount of the resin additive composition.

4. The resin additive composition according to claim 3, wherein said resin additive composition is in a pellet form.

5. A synthetic resin composition comprising:
   a polyolefin resin; and
   a resin additive composition,
   wherein, said resin additive composition comprises:
   (A) sodium-2,2'-methylene-bis(4,6-di-tert-butylphenyl) phosphate;
   (B) a lithium phosphate compound represented by the following Formula (1); and
   (C) at least one fatty acid metal salt represented by the following Formula (2) selected from the group consisting of lauric acid metal salt, myristic acid metal salt, palmitic acid metal salt, stearic acid metal salt, arachidic acid metal salt, behenic acid metal salt, and 12-hydroxystearic acid metal salt, and wherein the metal is lithium,
   wherein the content of said component (B) is in the range of 25 to 400 parts by mass with respect to 100 parts by mass of said component (A); and
   wherein the content of said component (C) is in the range of 10 to 50 parts by mass with respect to 100 parts by mass of said components (A) and (B):

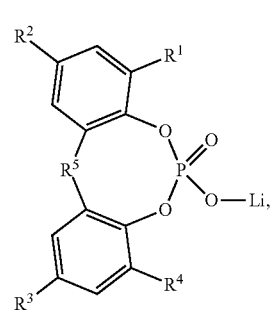
(1)

wherein, $R^1$ to $R^4$ represent a t-butyl group; and $R^5$ represents a methylene group.

6. The synthetic resin composition according to claim 5, wherein the content of said resin additive composition is in the range of 0.001 to 5 parts by mass in terms of the total amount of said components (A) and (B) with respect to 100 parts by mass of said polyolefin resin.

7. A molded article obtained by a blending of a resin additive composition with a polyolefin resin and molding thereof:
wherein said resin additive composition comprises:
(A) sodium-2,2'-methyl ene-bi s(4,6-di-tert-butylphenyl) phosphate;
(B) a lithium phosphate compound represented by the following Formula (1); and
(C) at least one fatty acid metal salt represented by the following Formula (2) selected from the group consisting of lauric acid metal salt, myristic acid metal salt, palmitic acid metal salt, stearic acid metal salt, arachidic acid metal salt, behenic acid metal salt, and 12-hydroxystearic acid metal salt, and wherein the metal is lithium,
wherein the content of said component (B) is in the range of 25 to 400 parts by mass with respect to 100 parts by mass of said component (A);
and the content of said component (C) is in the range of 10 to 50 parts by mass with respect to 100 parts by mass of said components (A) and (B):

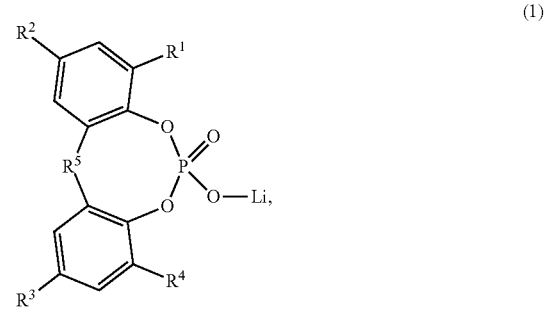

wherein, $R^1$ to $R^4$ represent a t-butyl group; and $R^5$ represents a methylene group

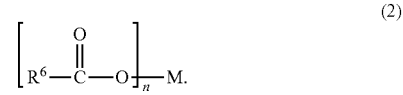

* * * * *